US009944857B2

(12) United States Patent
Dayton et al.

(10) Patent No.: US 9,944,857 B2
(45) Date of Patent: Apr. 17, 2018

(54) CATALYTIC BIOMASS PYROLYSIS PROCESS

(71) Applicant: RESEARCH TRIANGLE INSTITUTE, Research Triangle Park, NC (US)

(72) Inventors: David C. Dayton, Chapel Hill, NC (US); Raghubir P. Gupta, Durham, NC (US); Brian S. Turk, Durham, NC (US); Atish Kataria, Durham, NC (US); Jian-Ping Shen, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 240 days.

(21) Appl. No.: 14/382,822

(22) PCT Filed: Mar. 6, 2013

(86) PCT No.: PCT/US2013/029379
§ 371 (c)(1),
(2) Date: Sep. 4, 2014

(87) PCT Pub. No.: WO2013/134391
PCT Pub. Date: Sep. 12, 2013

(65) Prior Publication Data
US 2015/0051428 A1 Feb. 19, 2015

Related U.S. Application Data

(60) Provisional application No. 61/607,866, filed on Mar. 7, 2012.

(51) Int. Cl.
*C10B 53/02* (2006.01)
*C10G 1/00* (2006.01)
(Continued)

(52) U.S. Cl.
CPC ............. *C10B 53/02* (2013.01); *B01J 23/002* (2013.01); *B01J 23/70* (2013.01); *B01J 23/78* (2013.01);
(Continued)

(58) Field of Classification Search
CPC ......... C10B 53/02; C10B 57/06; C10G 1/002; C10G 1/086; C10G 1/08; B01J 23/78;
(Continued)

(56) References Cited

U.S. PATENT DOCUMENTS 5,689,005 A * 11/1997 Hagemeyer ............. C07B 31/00
564/420
5,792,340 A * 8/1998 Freel ....................... C10B 49/20
201/12
(Continued)

FOREIGN PATENT DOCUMENTS

CN 101392179 3/2009
CN 102015969 4/2011
(Continued)

OTHER PUBLICATIONS

Bulushev et al., "Catalysis for Conversion of Biomass to Fuels via Pyrolysis and Gasification: A Review," *Catalysis Today*, 2011, vol. 171, pp. 1-13.

*Primary Examiner* — Brian A McCaig
*Assistant Examiner* — Jason Y Chong
(74) *Attorney, Agent, or Firm* — Womble Bond Dickinson (US) LLP

(57) ABSTRACT

Described herein are processes for converting a biomass starting material (such as lignocellulosic materials) into a low oxygen containing, stable liquid intermediate that can be refined to make liquid hydrocarbon fuels. More specifically, the process can be a catalytic biomass pyrolysis process wherein an oxygen removing catalyst is employed in
(Continued)

the reactor while the biomass is subjected to pyrolysis conditions. The stream exiting the pyrolysis reactor comprises bio-oil having a low oxygen content, and such stream may be subjected to further steps, such as separation and/or condensation to isolate the bio-oil.

22 Claims, 4 Drawing Sheets

(51) Int. Cl.
| | |
|---|---|
| C10G 1/08 | (2006.01) |
| B01J 23/78 | (2006.01) |
| B01J 37/00 | (2006.01) |
| C10B 57/06 | (2006.01) |
| B01J 37/03 | (2006.01) |
| B01J 38/10 | (2006.01) |
| B01J 38/12 | (2006.01) |
| B01J 23/889 | (2006.01) |
| B01J 23/00 | (2006.01) |
| B01J 23/70 | (2006.01) |
| B01J 23/835 | (2006.01) |
| B01J 23/85 | (2006.01) |
| B01J 37/18 | (2006.01) |
| B01J 38/06 | (2006.01) |
| B01J 23/94 | (2006.01) |

(52) U.S. Cl.
CPC ............. *B01J 23/835* (2013.01); *B01J 23/85* (2013.01); *B01J 23/8892* (2013.01); *B01J 37/0045* (2013.01); *B01J 37/03* (2013.01); *B01J 38/10* (2013.01); *B01J 38/12* (2013.01); *C10B 57/06* (2013.01); *C10G 1/002* (2013.01); *C10G 1/08* (2013.01); *C10G 1/086* (2013.01); *B01J 23/94* (2013.01); *B01J 37/18* (2013.01); *B01J 38/06* (2013.01); *C10G 2300/1011* (2013.01); *Y02E 50/13* (2013.01); *Y02E 50/14* (2013.01); *Y02E 50/32* (2013.01); *Y02P 20/145* (2015.11); *Y02P 30/20* (2015.11); *Y02T 50/678* (2013.01)

(58) Field of Classification Search
CPC ........ B01J 37/0045; B01J 37/03; B01J 38/10; B01J 38/12; B01J 23/8892; B01J 23/002; B01J 23/70; B01J 23/835; B01J 23/85
See application file for complete search history.

(56) References Cited

U.S. PATENT DOCUMENTS

| | | |
|---|---|---|
| 7,259,286 B2 | 8/2007 | Jothimurugesan et al. |
| 2009/0165378 A1 | 7/2009 | Agblevor |
| 2009/0227823 A1* | 9/2009 | Huber .................... C10G 1/002 585/324 |
| 2009/0239279 A1 | 9/2009 | Hall et al. |
| 2010/0076238 A1 | 3/2010 | Brandvoid et al. |
| 2010/0251615 A1 | 10/2010 | Marker et al. |
| 2011/0138681 A1 | 6/2011 | Ramirez Corredores et al. |
| 2011/0232166 A1* | 9/2011 | Kocal ..................... C08H 8/00 44/313 |
| 2011/0315931 A1 | 12/2011 | Aradi et al. |

FOREIGN PATENT DOCUMENTS

| | | |
|---|---|---|
| JP | 2005 161134 | 6/2005 |
| JP | 2008-201754 | 9/2008 |
| KR | 10-2009-0128537 | 12/2009 |
| KR | 10-2010-0015425 | 2/2010 |
| WO | WO2010/129170 | 11/2010 |

* cited by examiner

CATALYTIC BIOMASS PYROLYSIS PROCESS

CROSS-REFERENCE TO RELATED APPLICATIONS

The present application is a U.S. National Stage of International Patent Application PCT/US2013/029379, filed Mar. 6, 2013, and claims priority to U.S. Provisional Patent Application No. 61/607,866, filed Mar. 7, 2012. The disclosures of each of the applications noted above are incorporated herein by reference in their entirety.

GOVERNMENT LICENSE RIGHTS

This invention was made with government support under Grant No. DE-AR0000021 awarded by the U.S. Department of Energy/Advanced Research Projects Agency-Energy (DOE/ARPA-E). The government has certain rights in the invention.

FIELD OF THE DISCLOSURE

The present disclosure is directed to processes for biomass pyrolysis. More particularly, the processes provides catalytic pyrolysis methods for converting biomass to a low oxygen content bio-crude that may be further processed to prepare useful products, such as biofuels.

BACKGROUND

To supplement or even replace conventional fuels derived from decreasing petroleum supplies, fuels formed from renewable sources, particularly biological sources (i.e., so-called "biofuels"), are being sought and developed. Currently, biofuels, such as ethanol, are produced largely from grains, but a large, untapped resource of plant biomass exists in the form of lignocellulosic material. This untapped resource is estimated to encompass more than a billion tons per year (see U.S. Department of Energy (2011) U.S. Billion-Ton Update: Biomass Supply for a Bioenergy and Bioproducts Industry, Perlack and Stokes, ORNL/TM-2011/224, Oak Ridge National Laboratory, Oak Ridge, Tenn., p. 227—available online at http://www1.eere.energy.gov/biomass/pdfs/billion_ton_update.pdf). Although age-old processes are available for converting the starch content of grain into sugars, which can then be converted to ethanol, the conversion of lignocellulose to biofuel is much more difficult.

Pyrolysis is a thermochemical processing option for producing liquid transportation fuels from biomass. Traditional biomass flash pyrolysis processes have demonstrated a roughly 70% liquid product yield; however, this pyrolysis oil product has limited use without additional upgrading or refining. Current, commercial biomass pyrolysis processes are primarily used to produce commodity chemicals for the food products industry. Fuel uses for raw pyrolysis oils have been demonstrated for electric power production in boilers, diesel engines, and (with limited success) in turbines.

Biomass pyrolysis is the thermal depolymerization of biomass at modest temperatures in the absence of added oxygen to produce a mixture of solid, liquid, and gaseous products depending on the pyrolysis temperature and residence time. Charcoal yields of up to 35% can be achieved for slow pyrolysis at low temperature, high pressure, and long residence time. Flash pyrolysis is used to optimize the liquid products as an oil known as bio-crude or bio-oil. High heating rates and short residence times enable rapid biomass pyrolysis while minimizing vapor cracking to optimize liquid product yields with up to about 70% efficiency on a weight basis.

Bio-oil can be upgraded either at the source prior to full production or after the formation of the liquid product. To date, the two most popular methods in post-production upgrading are adapted from traditional hydrocarbon processing. These processes are bio-oil cracking over solid acid catalysts and hydrotreating in the presence of high pressure hydrogen and a hydrodesulfurization (HDS) catalyst. Although both of these processes have the potential to bring down the oxygen content to a desirable level, it should be noted that both cracking and hydrotreating are accompanied by the loss of hydrogen (as $H_2O$) and carbon (as $CO_2$ or CO) from the bio-oil.

Hydrodeoxygenation (HDO) is carried out at high temperatures (200 to 450° C.) and in the presence of a typical HDO catalysts, most commonly CoMo or NiMo sulfide catalysts. Loss of hydrogen as water during hydrotreating significantly lowers the hydrogen content of bio-oil. In order to offset this, hydrogen typically is externally added during the process at high pressures (e.g., 3 to 12 MPa). As a result, external hydrogen demand can be high—e.g., calculated to be on the order of 41 kg per ton of biomass. Since hydrogen is added to the process at some cost, such a high hydrogen demand makes HDO uneconomical. HDO can be conceptually characterized as follows:

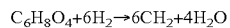

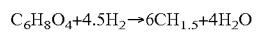

Cracking reactions in bio-oils can occur at atmospheric pressure using an acid catalyst. In catalytic cracking, deoxygenation can take place as a result of one or more of dehydration, decarboxylation, and decarbonylation reactions. Decarboxylation specifically leads to the increase in hydrogen-to-carbon (H/C) ratio, thereby increasing the heating value or energy density. Dehydration and decarboxylation reactions can be controlled by modifying the reaction temperature. In general, lower temperatures favor a dehydration reaction, whereas higher temperatures favor a decarboxylation reaction.

Many catalysts have been exploited for the catalytic cracking of pyrolysis oils including zeolites (e.g., H-ZSM-5 and ultrastable Y-zeolite), mesoporous materials like MCM-41 and Al-MCM-41, and heteropolyacids (HPAs). The main disadvantage associated with heteropolyacids is that they are fairly soluble in polar solvents and lose their activity at higher temperatures by losing structural integrity. Major components of bio-oils (phenols, aldehydes, and carboxylic acids) have low reactivity on ZSM-5 and undergo thermal decomposition producing coke.

Zeolite catalysts also deactivate quickly by coke formation from the decomposition of large organic molecules present in the bio-oil. This blocks the pores and decreases the number of available catalytic sites. The large amount of water vapor in bio-oils also leads to dealumination of zeolite materials causing loss of surface area and irreversible deactivation. In comparison, catalytic cracking is regarded as a cheaper route of converting oxygenated feedstocks to lighter fractions. This process, however, leads to higher coke formation (about 8-25 wt %). Unlike the petroleum crude oil upgrading, upgrading of high oxygen content (about 35-50 wt % on a dry basis—i.e., excluding oxygen from any water that may be present) bio-crude into suitable quality biofuels using traditional catalysts will result in significant weight loss of hydrogen and carbon and subsequently decrease the conversion efficiency. During these processes, only a fraction of the carbon present in the raw bio-oil ends up in the upgraded bio-oil. Losses to carbon oxide, and carbon deposition on the catalyst, and system fouling substantially reduce the biomass carbon conversion to final products when upgrading fast pyrolysis bio-oil.

Similar to petroleum crude oil processes, key issues such as coke deposition and catalyst stability still remain for biomass processing or bio-crude upgrading over the conventional catalysts. In some cases, the conventional catalysts may no longer be suitable for bio-crude or biomass processing. For example, due to low sulfur content in the initial biomass feedstock, the conventional sulfided CoMo HDS catalysts used extensively for hydroprocessing in oil refining may not be suitable for bio-crude hydrotreating. The low sulfur environment may cause the reduction of sulfided Co or Ni catalysts to the metal state followed by rapid coke deposition and catalyst deactivation. The necessity to add sulfur donor compounds to the feedstock to maintain the catalytic activity, however, may complicate the process and potentially add sulfur to the fuel product. Cracking over acidic catalysts like zeolites and supported metal oxides ($Al_2O_3$), which have the tendency to undergo rapid deactivation due to coking, leads to relatively high yields of light hydrocarbons. Thus, an improved or novel catalyst with better stability for coke formation resistance and higher selectivity towards bio-oil formation will be needed for biomass conversion to bio-oil.

Using dehydration of a fast pyrolysis bio-oil to achieve removal of oxygen (the main product of HDO and cracking over acid catalysts) would require over 80% of the hydrogen in the bio-oil if no external hydrogen were supplied. As a result, a significant amount of hydrogen input is needed to make up for the hydrogen loss as water and thus increase the H/C ratio to a value in the range of 1.9 to 2.4. For example, approximately 20 to 45 kg of hydrogen is required for one ton of biomass to achieve a theoretical yield of 75 to 98 gallons of biofuel per ton of biomass. A number of analyses reveal that upgrading of bio-crude through hydrotreating is not economically attractive because of the high demand of hydrogen. It can also be seen that similar issues will occur to the upgrading of bio-crude through conventional cracking over acid catalysts. Therefore, conventional methodologies such as hydrotreating and cracking do not allow higher efficiencies to be achieved during the conversion of biomass to upgraded bio-oil. In order to achieve high conversion efficiencies, a catalytic biomass pyrolysis process that selectively deoxygenates the biomass with minimal hydrogen and carbon loss can be advantageous. Thus, there remains a need in the art for useful processes for transformation of biomass into high value commodities and/or stable intermediates therefor.

Recent studies have detailed the potential of catalytically upgrading condensed bio-oil into gasoline range hydrocarbons. For example, U.S. Pat. Pub. No. 2009/7578927 to T. Marker et al. describes work with the National Renewable Energy Laboratory (NREL) and the Pacific Northwest National Laboratory (PNNL) for developing a two-stage hydrotreating process to upgrade raw bio-oil into gasoline and diesel. This work focused on separating the pyrolytic lignin fraction of whole bio-oil, blending this fraction with vegetable oils and free fatty acids to form a slurry, and injecting the slurry into a hydrotreating reactor/process with nickel catalysts.

Another process option is catalytic biomass pyrolysis to catalytically modify the composition of the bio-crude intermediate to improve the efficiency of the upgrading step. For example, U.S. Pat. Pub. No. 2010/0105970 to P. O'Conner et al. describes catalytic pyrolysis in a three-riser FCC-type process. The process first consisted of mixing a base catalyst with biomass in a pretreatment step and reacting at a temperature of 200 to 350° C. The second step consisted of acid catalyst cracking and deoxygenation at 350 to 400° C. where the products from the first step were added to a reactor with a solid acid catalyst. The process further made use of a regenerator operating at temperatures up to 800° C. to burn the coke deposits on the catalyst and provide process heat.

U.S. Pat. Pub. No. 2009/0227823 to G. Huber described catalytic pyrolysis using zeolites that are unpromoted or are promoted with metals. The pyrolysis was carried out at a temperature of 500 to 600° C. and a pressure of 1 to 4 atm (approximately 101 to 405 KPa) to produce a highly aromatic product.

Publication WO 2009/018531 to F. Agblevor described the use of catalytic pyrolysis to selectively convert the cellulose and hemicellulose fractions of biomass to light gases and leave behind pyrolytic lignin. The methods used H-ZSM-5 and sulfated zirconia catalysts in a fluidized bed reactor to obtain an overall bio-oil yield of 18-21%.

SUMMARY OF THE DISCLOSURE

The present disclosure provides catalytic biomass pyrolysis processes that are beneficial for forming a liquid bio-oil pyrolysis product rich in hydrocarbons and simultaneously low in oxygen content. The low oxygen content makes the bio-oil particularly beneficial in that it is more thermally stable than bio-oil product from known pyrolysis reactions. Likewise, the low oxygen content bio-oil prepared according to the present disclosure may immediately be subjected to refining to prepare biofuels without the need for intermediate steps, such as deoxygenation or stabilization by mild hydrotreating. Further, the bio-oil prepared according to the disclosure may be blended with a petroleum oil stream and thus subjected to refining or other processes or uses common to petroleum oil. Still further, the inventive process is useful because the catalytic pyrolysis process improves carbon conversion efficiency in comparison to known integrated pyrolysis processes for biofuel production. Particularly, typical post-pyrolysis treatments to remove oxygen also remove some of carbon (i.e., in the form of coke deposits, CO, or $CO_2$), and the presently disclosed subject matter overcomes this problem. Thus, the pyrolysis product is in a stable, intermediate form that is ready for refining and that maintains a high percentage of the carbon originally present in the biomass starting material. This correlates to a more efficient pyrolysis process wherein a greater content of useful bio-oil is produced in relation to the amount of biomass used in the pyrolysis reaction. In certain embodiments, the reaction can provide for selective removal of oxygen from the biomass starting material via one or both of direct catalytic deoxygenation and indirect deoxygenation through catalytic hydrogen production and in situ hydrodeoxygenation.

In one embodiment, the disclosure thus provides a catalytic biomass pyrolysis process that comprises reacting a biomass starting material under pyrolysis conditions in the presence of a catalyst to form a stream comprising a pyrolysis product. The stream can be divided into a solids component or fraction (i.e., containing the catalyst and any pyrolysis product solids—e.g., char) and a vapor (condensable) and gas (non-condensable) component or fraction. In specific embodiments, the vapor and gas fraction of the pyrolysis product has an oxygen content of about 20% or less by weight, preferably about 10% or less by weight (on a dry weight basis). Since at least a portion of the vapor and gas fraction may be condensed to form a bio-oil, the bio-oil formed from the process likewise can have an oxygen content of about 20% or less by weight, preferably about 10% or less by weight on a dry weight basis.

The disclosed subject matter is beneficial in that a wide variety of starting materials may be used as the feedstock in the pyrolysis process. Particularly, any type of biomass may be used. In specific embodiments, the biomass starting material used in the catalytic pyrolysis process can comprise a lignocellulosic material. In some embodiments, the biomass starting material can be characterized as being particularized and can have an average particle size of about 25 mm or less. In particular embodiments, the biomass starting material can have an average particle size of about 0.1 mm to about 25 mm.

The inventive process also can be defined by the use of a catalyst in the actual pyrolysis step. In other words, the catalyst material that is used is combined with the biomass starting material in the pyrolysis reactor. Preferably, the catalyst is a material that promotes deoxygenation of the pyrolysis products prior to separation of the catalyst from the reaction products. Thus, the catalyst can be defined as an oxygen-removing agent. Such deoxygenation specifically can take place in the reactor under the pyrolysis conditions. In specific embodiments, the catalyst can comprise an iron oxide material. Further, the catalyst can be a mixed metal oxide, such as a bifunctional catalyst. Preferably, the bifunctional catalyst can be a material that is useful to convert any water vapor formed during biomass pyrolysis into hydrogen to provide a reactive environment for hydrodeoxygenation and also be useful to remove oxygen from biomass pyrolysis vapors without removing carbon.

In certain embodiments, the catalyst can comprise a mixture of iron oxide and tin oxide. The catalyst may be defined as comprising a mixture of iron oxide and a metallic oxide promoter. For example, the promoter can be selected from the group consisting of chromium oxide, nickel oxide, manganese oxide, cobalt oxide, molybdenum oxide, and combinations thereof. In some embodiments, the catalyst can be defined as being a bifunctional catalyst. Further, the catalyst can comprise a supported metal or reduced metal oxide catalyst with variable valence states. Preferably, the catalyst is regenerable and is insensitive to ash present in the biomass or formed in the pyrolysis process.

The process can comprise feeding the biomass starting material into a reactor wherein the biomass is subjected to the pyrolysis conditions in the presence of the catalyst. The biomass starting material can be fed into the reactor without premixing with the catalyst (which can provide characteristics of a heat transfer medium). Other, non-catalyst heat transfer media also can be used, such as alumina, silica, olivine, and sands.

The catalytic biomass pyrolysis reaction can be carried out in a variety of different types of reactors. Preferably, the reactor is a fluid-type reactor, such as a fluidized bed or a transport reactor. In one embodiment, a riser reactor may be used. The biomass starting material can be transported through the reactor at a defined rate—e.g., a rate such that the residence time is less than defined time, such as about 5 seconds or less.

Preferably, the reactor used is one that is capable of achieving the necessary pyrolysis conditions to form a reaction product with the beneficial characteristics described herein, such as low oxygen content and high carbon conversion efficiency. Specifically, it can be beneficial to use a reactor that is adapted for relatively short residence times of the biomass and the catalyst in the reactor, as noted above. Another pyrolysis condition to be considered is reaction temperature. In specific embodiments, the reacting of the biomass in the presence of the catalyst can be carried out at a temperature of about 200° C. to about 700° C. or a temperature of about 550° C. or less. In other embodiments, the reacting of the biomass can be carried out at a pressure of up to about 25 bar (2.5 MPa). In some embodiments, reacting can be carried out at ambient pressure to near ambient pressure. Still further, it can be useful for the biomass and the catalyst to be combined in the reactor in a specific mass ratio. In some embodiments, the catalyst and the biomass can be provided in a mass ratio of about 1:1 to about 100:1.

As noted above, the pyrolysis process of the disclosure can comprise separation of the pyrolysis products into two or more different fractions. This can comprise transferring the stream comprising the pyrolysis product to a separator. In some embodiments, the stream may be separated into a vapor and gas fraction and a solids fraction, which comprises solid reaction products and the catalyst. The inventive method also can comprise regenerating and recycling the catalyst into the pyrolysis process. In some embodiments, this also may include transferring the catalyst from the separator through a reducing zone prior to re-introduction into the reactor.

In other embodiments, the present disclosure further can provide a catalytic biomass pyrolysis system. In particular embodiments, such system can comprise: a reactor adapted for combining a biomass with a catalyst under pyrolysis conditions to form a pyrolysis reaction stream; a separation unit in fluid connection with the reactor and adapted to form a first stream comprising a solids fraction from the pyrolysis reaction stream and a second stream comprising a vapors fraction from the pyrolysis reaction stream; a condenser unit in fluid communication with the separation unit and adapted to condense a bio-crude from the vapors in the second stream separate from a gas component of the second stream; an optional liquid separator unit in fluid communication with the condenser unit and adapted to separate water or another liquid from the bio-crude; a catalyst regeneration unit in fluid communication with the separation unit and adapted to remove non-catalyst solids from the solid catalyst present in the first stream; a reduction unit in fluid communication with the catalyst regeneration unit and adapted to reduce oxidized catalyst received from the catalyst regeneration unit; and a catalyst delivery stream adapted to deliver reduced catalyst from the reduction unit to the reactor.

The system can comprise an oxidant stream in fluid communication with the catalyst regeneration unit and adapted to deliver an oxidant to the catalyst regeneration unit. The condenser unit can be in fluid communication with the reduction unit via a gas flow stream adapted to transfer a portion of the gas component of the second stream to the reduction unit. The catalytic biomass pyrolysis system can comprise a blower unit interposed between and in fluid communication with the condenser unit and the reduction unit. The catalytic biomass pyrolysis system can comprise a biomass preparation unit in fluid communication with the reactor and adapted to transfer the biomass to the reactor. The biomass preparation unit can be adapted to particularize a solid biomass to a size of about 25 mm or less. The reactor of the catalytic biomass pyrolysis system can be adapted to combine the catalyst and the biomass in a ratio of about 1:1 to about 100:1 based on mass. The reactor can be a transport reactor. The reactor can be adapted to accommodate flow of the biomass therethrough with a residence time of about 5 seconds or less. The reactor can be adapted to a function at a temperature of about 200° C. to about 700° C. or at a temperature of about 550° C. or less. The reactor can be adapted to function at a pressure of up to about 25 bar (2.5 MPa).

BRIEF DESCRIPTION OF THE DRAWINGS

Figure 1:
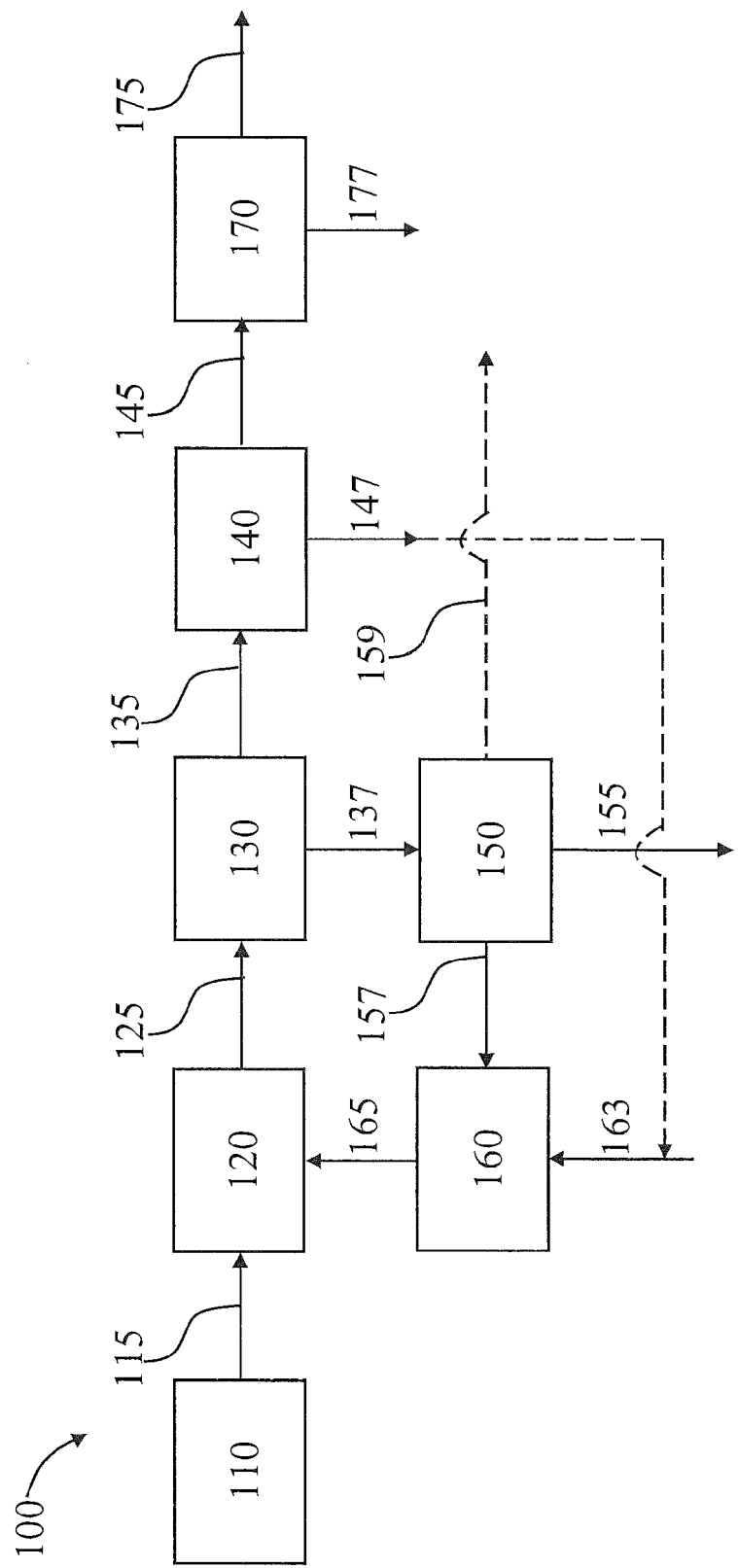
Figure 2:
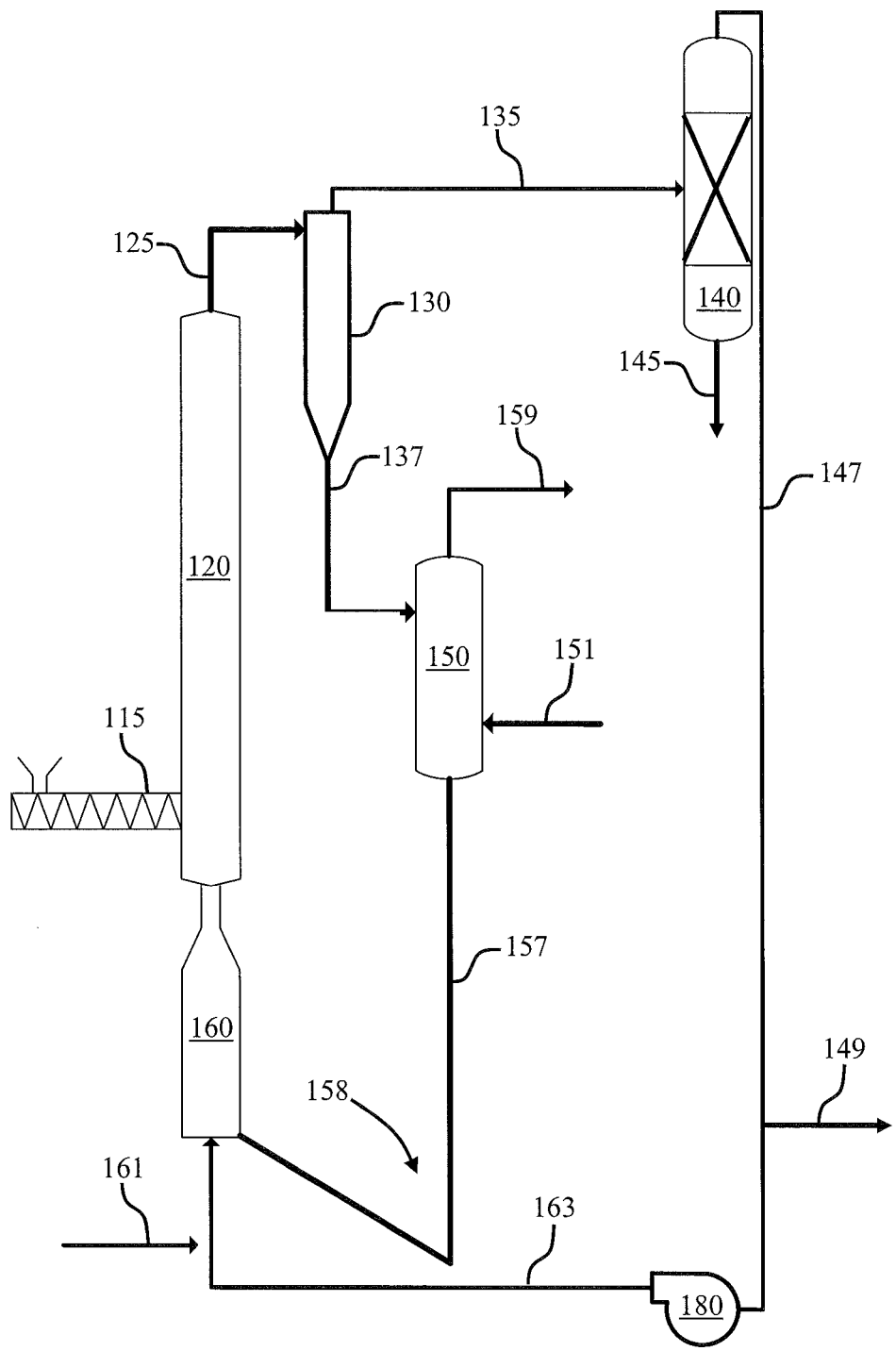
Figure 3:
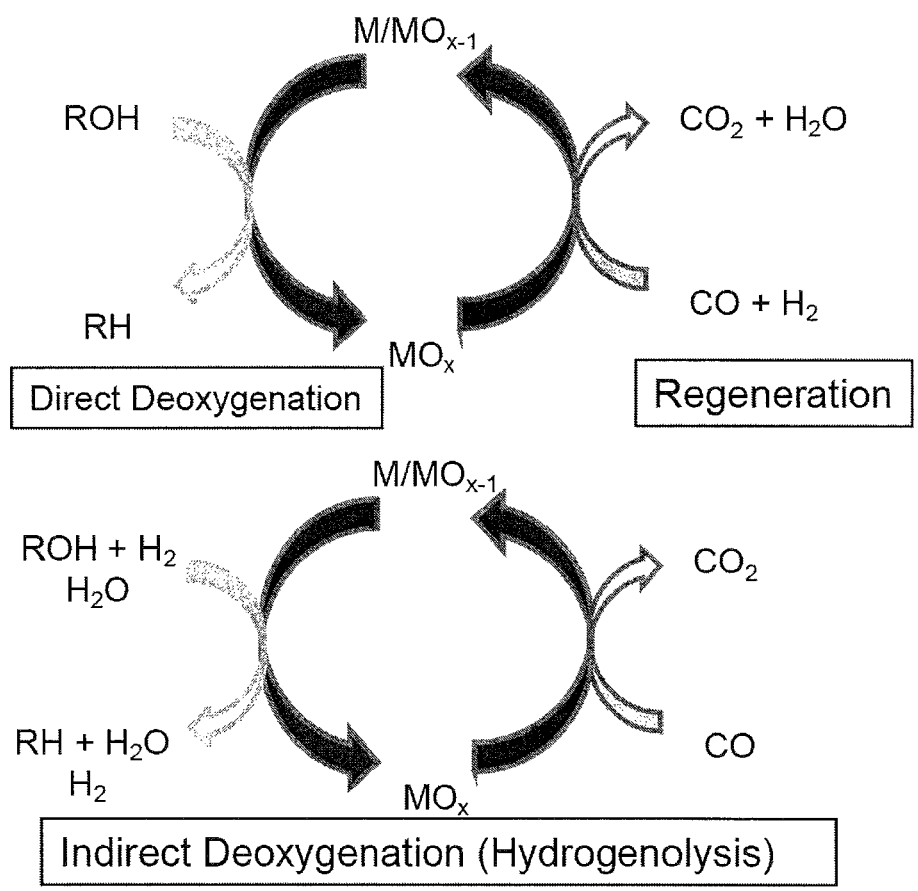
Figure 4:
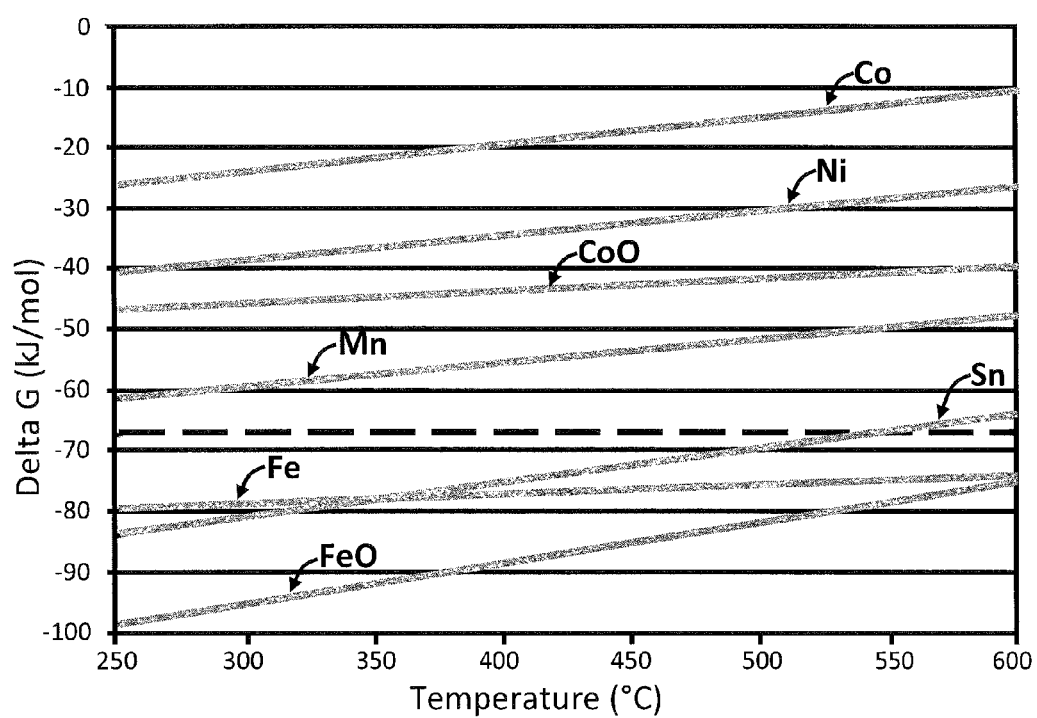

Having thus described the disclosed subject matter in general terms, reference will now be made to the accompanying drawings, which are not necessarily drawn to scale, and wherein:

FIG. 1 is a block diagram of a catalytic biomass pyrolysis transport reactor system according to one embodiment of the present invention;

FIG. 2 illustrates a transport reactor loop useful according to one embodiment of the invention;

FIG. 3 is a schematic of reaction processes believed to occur in the catalytic biomass pyrolysis process according to certain embodiments of the invention; and FIG. 4 is a graph of the temperature versus Delta G (Gibbs Free Energy) for various metal species in the deoxygenation of phenol to benzene.

DETAILED DESCRIPTION OF THE DISCLOSURE

The disclosed subject matter now will be described more fully hereinafter through reference to various embodiments. These embodiments are provided so that this disclosure will be thorough and complete, and will fully convey the scope of the subject matter to those skilled in the art. Indeed, the disclosed subject matter may be embodied in many different forms and should not be construed as limited to the embodiments set forth herein; rather, these embodiments are provided so that this disclosure will satisfy applicable legal requirements. As used herein, the singular forms "a", "an", "the", include plural referents unless the context clearly dictates otherwise.

The present disclosure provides processes for the production of a bio-oil material from a biomass starting material. In certain embodiments, the processes can comprise reacting the biomass starting material in the presence of a catalyst under pyrolysis conditions sufficient to transform the biomass starting material into a pyrolysis product, which can comprise a bio-oil. The pyrolysis product specifically can comprise a solids fraction and a condensable vapor fraction, as well as a fraction of gases that do not condense at ambient conditions.

The present disclosure arises from the recognition that highly active and selective catalysts are effective in manipulating biomass thermal depolymerization to minimize char and light gas production while maximizing liquid bio-oil yields. In some embodiments, the disclosed subject matter provides robust, integrated processes that can achieve the short residence times (e.g., about 0.5 to about 2 seconds) and high heat transfer rates for maximum liquid bio-oil yields while optimizing process integration to maintain catalyst activity by continuous regeneration. This combination can yield a condensed hydrocarbon liquid (bio-crude) that can be easily upgraded to fuels in the existing infrastructure.

The disclosed methods also can be defined by an ability to selectively extract oxygen during pyrolysis and fix the oxygen, in part, in the solid as metal oxides. This is in contrast to the conventional oxygen removal as $H_2O$ and carbon oxides (CO, $CO_2$), thus maintaining high carbon efficiency. The methods also can provide for higher catalyst activity compared to the current catalysts in order to promote low-temperature pyrolysis minimizing thermal cracking. Still further, the methods can make use of multifunctional catalysts that can promote hydrocarbon condensation reactions. In certain embodiments, a fast fluidized bed or transport reactor design can be used to provide adequate residence times to limit thermal exposure and yet maximize vapor/catalyst contact time.

The terms "bio-oil" and "bio-crude" can be used interchangeably and are intended to mean the fraction of reaction products obtained from a pyrolysis reaction that is liquid at ambient condition. The liquid-phase products may comprise hydrophilic phase compounds, hydrophobic phase compounds, or a mixture of hydrophilic and hydrophobic phase compounds. In certain embodiments, the bio-oil comprises a compound or a mixture of compounds such that the bio-oil is suitable for co-processing with traditional crude oil in existing oil refineries. As such, the bio-oil preferably comprises a compound or a mixture of compounds such that the bio-oil is suitable for undergoing further reactions, such as distillation and/or catalytic processing, that transform the bio-oil into a biofuel, such as bio-diesel, bio-gasoline, bio-jet fuel, or the like.

Bio-oil is recognized as comprising a large number of different compounds. Table 1 provides the composition arising from typical, uncatalyzed fast pyrolysis of two types of wood at a temperature of approximately 500° C. (from Piskorz, J., et al., 1988, In Pyrolysis Oils from Biomass, Soltes, E. J. and Milne, T. A., eds., ACS Symposium Series 376).

TABLE 1

|  | White Spruce | Poplar |
| --- | --- | --- |
| Product Yields, wt % | | |
| Water | 11.6 | 12.2 |
| Gas | 7.8 | 10.8 |
| Bio-char | 12.2 | 7.7 |
| Bio-oil | 66.5 | 65.7 |
| Bio-Oil Composition, wt % | | |
| Saccharides | 3.3 | 2.4 |
| Anhydrosugars | 6.5 | 6.8 |
| Aldehydes | 10.1 | 14.0 |
| Furans | 0.35 | — |
| Ketones | 1.24 | 1.4 |
| Alcohols | 2.0 | 1.2 |
| Carboxylic Acids | 11.0 | 8.5 |
| Water-Soluble - Total Above | 34.5 | 34.3 |
| Pyrolytic Lignin | 20.6 | 16.2 |
| Unaccounted Fraction | 11.4 | 15.2 |

Approximately 35-40% by weight of the bio-oil derived from the typical, art-recognized, uncatalyzed fast pyrolysis reaction is oxygen-containing, water-soluble materials. The presently disclosed subject matter provides a clear improvement upon the art because of the ability to provide bio-oil as a pyrolysis reaction product that is significantly lower in oxygen content and is much more suitable for refining to form biofuels.

The biomass starting material used in the presently disclosed subject matter can comprise a wide variety of biological resources. For example, in some embodiments, the term biomass can take on the meaning set forth in the Energy Policy Act of 2005. Accordingly, the term "biomass" can mean: any lignin waste material that is segregated from other waste materials and is determined to be nonhazardous by the Administrator of the Environmental Protection Agency and any solid, nonhazardous, cellulosic material that is derived from—(A) any of the following forest-related resources: mill residues, precommercial thinnings, slash, and brush, or nonmerchantable material; (B) solid wood waste materials, including waste pallets, crates, dunnage, manufacturing and construction wood wastes (other than pressure-treated, chemically-treated, or painted wood wastes), and landscape or right-of-way tree trimmings, but not including municipal solid waste (garbage), gas derived from the biodegradation of solid waste, or paper that is commonly recycled; (C) agriculture wastes, including orchard tree crops, vineyard, grain, legumes, sugar, and other crop by-products or residues, and livestock waste nutrients; or (D) a plant that is grown exclusively as a fuel for the production of electricity. Exemplary plants useful as a fuel for energy production include switchgrass, miscanthus, energy canes, sorghum, willows, poplar, and eucalyptus.

In some embodiments, the biomass starting material can be any material comprising at least a fraction of a cellulosic and/or lignocellulosic material. Cellulose is a polysaccharide formed of 1,4-linked glucose units and is the primary structural component found in plants. Cellulose is the most abundant organic chemical on earth, and there is an estimated annual biosphere production of approximately $90 \times 10^9$ metric tons of the material. Lignin is a compound that is most commonly derived from wood and is an integral part of the cell walls of plants. It is a three-dimensional amorphous natural polymer containing phenylpropane units that are tri- or tetra-substituted with hydroxyl groups and methoxyl groups. Lignin makes up about one-quarter to one-third of the dry mass of wood and generally lacks a defined primary structure. Lignocellulose is primarily a combination of cellulose, lignin, and hemicellulose.

The biomass starting material particularly may comprise a wide variety of cellulosics and lignocellulosics. For example, the biomass can be derived from both herbaceous and woody sources. Non-limiting examples of herbaceous biomass sources useful according to the invention include wood (hardwood and/or softwood), tobacco, corn, corn residues, corn cobs, cornhusks, sugarcane bagasse, castor oil plant, rapeseed plant, soybean plant, cereal straw, grain processing by-products, bamboo, bamboo pulp, bamboo sawdust, and energy grasses, such as switchgrass, miscanthus, and reed canary grass. Still further, useful biomass may comprise "waste" materials, such as corn stover, rice straw, paper sludge, and waste papers. The biomass also may comprise various grades of paper and pulp, including recycled paper, which include various amounts of lignins, recycled pulp, bleached paper or pulp, semi-bleached paper or pulp, and unbleached paper or pulp.

In the catalytic biomass pyrolysis process, biomass preparation can comprise size reduction and drying of the biomass. Thus, the biomass can be characterized as being particularized, which may be a natural state of the biomass or may result from processing steps wherein a biomass material is converted to a particularized form. Ideally, the size of the biomass introduced into the reactor can be such that heat transfer rates are high enough to maximize bio-oil production. Cost of size reduction and bio-oil yield preferably are balanced. In certain embodiments of the present process, biomass particles can have an average size of about 25 mm or less, about 20 mm or less, about 10 mm or less, about 5 mm or less, about 2 mm or less, or about 1 mm or less. In specific embodiments, average particle size can be about 0.1 mm to about 25 mm, about 0.1 mm to about 20 mm, about 0.1 mm to about 10 mm, about 0.1 mm to about 5 mm, or about 0.1 mm to about 2 mm.

Moisture content of the biomass preferably is as close as possible to 0% by weight. In some instances, this may be cost prohibitive. Moisture content of the biomass can be adjusted external to the process or internally by integrating a heat source to maintain the input biomass to a moisture content of about 15% or less, about 10%, about 7%, or about 5% or less by weight.

Biomass pyrolysis can form a cocktail of compounds in various phases, and the pyrolysis product can contain in the range of 300 or more compounds. In previous methods for the pyrolysis of biomass, the starting material typically is heated in the absence of added oxygen to produce a mixture of solid, liquid, and gaseous products depending upon the pyrolysis temperature and residence time. When biomass is heated at low temperatures and for long times (i.e., "slow pyrolysis"), charcoal is the dominant product. Gases are up to 80% by weight of the product when biomass is heated at temperatures above 700° C. In known methods of "fast pyrolysis" or "flash pyrolysis", biomass is rapidly heated to temperatures ranging from 400° C. to 650° C. with low residence times, and such methods commonly achieve products that are up to 75% by weight organic liquids on a dry feed basis. Although known methods of flash pyrolysis can produce bio-oils from various feedstocks, these oils typically are acidic, chemically unstable, and require upgrading (as shown above in Table 1).

The present disclosure provides improved processes for biomass pyrolysis that utilize specific catalysts and specific reaction conditions to form reaction products having a lower oxygen content compared to traditional fast pyrolysis processes. Specifically, the reaction products in known fast pyrolysis methods typically comprise from 35% to 50% by weight oxygen (i.e., oxygenated materials, such as esters, alcohols, aldehydes, ketones, sugars, and other oxy-compounds). The high oxygen content of the reaction products from known fast pyrolysis methods can contribute to the low stability of the reaction products and can complicate conversion of the reaction products into useful fuels, which typically are formed of mixtures of non-oxygenated, aliphatic and aromatic compounds. Accordingly, pyrolysis processes that produce reaction products that are reduced in oxygen content (such as according to the present invention) allow for easier conversion of the reaction product to biofuels.

The presently disclosed subject matter particularly can be defined by a reaction that is carried out under conditions (such as the presence of a catalyst as described herein, the use of a reaction temperature in a range described herein, and/or maintaining a reaction residence time as described herein) that result in the formation of a reaction product having a low oxygen content. In specific embodiments, the oxygen content of the reaction product can be about 30% or less, about 25% or less, about 20% or less, about 15% or less, about 10% or less, or about 5% or less by weight. In further embodiments, the oxygen content of the reaction product can be about 1% to about 25%, about 1% to about 20%, about 1% to about 15%, about 1% to about 10%, about 2% to about 10%, or about 5% to about 10% by weight. The foregoing values are on a dry weight basis. In some embodiments, the reaction product in relation to oxygen content can comprise the totality of the non-solid fraction exiting the reactor. Thus, the disclosed subject matter can provide a non-solid reaction product fraction, wherein the non-solid reaction product fraction has an oxygen content as described above. The disclosed subject matter also can provide a vapor and gas fraction of the reaction product, wherein the vapor and gas fraction has an oxygen content as described above. In specific embodiments, the reaction product in relation to oxygen content can comprise the bio-oil that is isolated from the totality of the reaction product exiting the reactor. The disclosed subject matter can provide a bio-oil fraction of the reaction product, wherein the bio-oil has an oxygen content as described above.

The presently disclosed subject matter also is beneficial because the pyrolysis products require less additional processing that can reduce carbon conversion efficiency. For example, in removing oxygen from the reaction products in known pyrolysis methods, catalytic or non-catalytic methods typically are employed that result in production of carbon dioxide or carbon monoxide, which reduces the overall carbon content of the bio-oil that can be converted to a biofuel. Carbon conversion efficiency can be described as the amount of carbon in the isolated bio-oil in comparison to the amount of carbon in the biomass starting material, as defined by the following formula.

$$\text{Carbon Conversion Efficiency} = \frac{\text{Mass of carbon in bio-oil}}{\text{Mass of carbon in input biomass}} \times 100$$

This calculation does not include carbon from additional sources that may be used as feed for the generation of power, heat, or hydrogen in potential process configurations of the present disclosure. Reduced carbon content leads to a reduction in the total amount of biofuel that can be formed from the pyrolysis products. The catalytic pyrolysis process of the present disclosure can be defined by a carbon conversion efficiency of about 20% or greater, about 30% or greater, about 40% or greater, about 50% or greater, about 60% or greater, or about 70% or greater.

As described more fully herein, the catalytic pyrolysis process of the present disclosure achieves oxygen removal during the pyrolysis reaction, and the reaction products have an overall reduced oxygen content. Such catalytic pyrolysis process may exhibit carbon conversion efficiency below that achievable by a fast pyrolysis process while still providing a resulting bio-oil defined by improved properties, including, without limitation, lower oxygen content, lower acidity, improved thermal stability, and lower water content. Such improved properties positively affect downstream processing, and can significantly increase yields of final products from upgrading of the bio-oil.

In certain embodiments, the catalytic pyrolysis process of the present disclosure can comprise reacting the biomass starting material under pyrolysis conditions in the presence of a catalyst to form a stream comprising a pyrolysis product fraction and a catalyst fraction. Particularly, the pyrolysis product fraction (or a further fraction thereof) can have an oxygen content that is preferably below a certain amount, as described above. This is a particularly beneficial aspect of the reaction because the low oxygen content of the product increases the usefulness of the reaction product as a bio-oil—i.e., a greater proportion of the reaction product is in a form that is useful as a bio-oil.

FIG. 1 shows a block flow diagram of a catalytic biomass pyrolysis process 100 according to one embodiment of the present disclosure. As shown therein, a biomass preparation unit 110 can be adapted for preparing the raw biomass for the pyrolysis process, including size reduction and drying of the raw biomass to the specifications otherwise described herein. The prepared biomass can then be delivered as stream 115 to a catalytic biomass pyrolysis unit 120 wherein the pyrolysis reaction can be carried out. Pyrolysis products as stream 125 then can be delivered to a solid/vapor separation unit 130 where pyrolysis vapors as stream 135 (including liquid fractions, if any are present) are separated and sent to a vapor condensation/liquid collection unit 140, and solids as stream 137 (including catalyst and solid biomass fractions) are sent to a catalyst regeneration unit 150. In the catalyst regeneration unit, biomass solids (e.g., ash) can be withdrawn as stream 155, and catalyst as stream 157 can be sent to a reduction unit 160 to prepare the catalyst for reintroduction into the catalytic biomass pyrolysis unit as regenerated catalyst stream 165. Exhaust stream 159 can be withdrawn as well and can comprise mainly $CO_2$. In the vapor condensation/liquid collection unit 140, liquid bio-oil is formed and sent as stream 145 to a liquid separator 170 for separating the bio-oil product as stream 175 from water and other liquid components as stream 177. Optionally, a hydrogen-rich tail gas can be withdrawn as stream 147 from the vapor condensation/liquid collection unit 140 and used as a catalyst reducing agent and/or carrier gas. Such tail gas may be introduced directly to the catalyst reduction unit 160 or into a reducing gas stream 163 entering the catalyst reduction unit 160.

Any type of reactor useful for carrying out a typical fast pyrolysis reaction could be used according to the invention. Preferentially, the reactor is one that is adaptable to the use of a catalyst with the properties discussed herein. Non-limiting examples of reactors that could be used in some embodiments of the invention include bubbling fluidized bed reactors, circulating fluidized bed/transport reactors, rotating cone pyrolyzers, ablative pyrolyzers, vacuum pyrolysis reactors, and auger reactors.

FIG. 2 shows a diagram of a catalytic biomass pyrolysis transport reactor system according to one embodiment that can be used to carry out processes as described herein. As illustrated, the prepared biomass is delivered in stream 115 to a reactor and is optionally combined with a carrier gas. The biomass specifically enters a mixing zone of the biomass pyrolysis unit 120 (a riser reactor in the exemplified embodiment) from where it is transported through a riser section of the reactor. One example of a material useful as a carrier gas according to the invention is nitrogen gas. The carrier gas may be provided at a sufficient rate relative to reactor diameter such that the biomass has a residence time in the riser section of about 5 seconds or less, about 4 seconds or less, about 3 seconds or less, about 2 seconds or less, or about 1 second or less.

The biomass entering the riser reactor comes in contact with the catalyst under the desired pyrolysis conditions, such as temperature, residence time, and catalyst to biomass ratio. In some embodiments, pyrolysis temperature can be in the range of about 200° C. to about 900° C., about 200° C. to about 700° C., about 200° C. to about 600° C., about 200° C. to about 550° C., about 250° C. to about 500° C., or about 300° C. to about 500° C. In specific embodiments, lower temperature ranges may be beneficial for minimizing undesirable thermal effects, such as cracking, and the use of specific catalysts may be beneficial in such embodiments. For example, reacting of the biomass in the presence of the catalyst can be carried out at a temperature of about 600° C. or less, about 550° C. or less, or about 500° C. or less. Residence time in the reactor can be as noted above and, specifically, can be about 0.5 seconds to about 5 seconds, about 0.5 seconds to about 4 seconds, about 0.5 seconds to about 3 seconds, or about 0.5 seconds to about 2 seconds.

In specific embodiments, the pyrolysis reaction can be carried out at ambient pressure. In other embodiments, the reaction can be carried out at an increased pressure, such as up to a pressure of about 35 bar (3.5 MPa). In other embodiments, reaction pressure can be about ambient pressure to about 25 bar (2.5 MPa), about ambient pressure to about 20 bar (2 MPa), or about ambient to about 10 bar (1 MPa).

The combination of the specific catalyst system and the desired pyrolysis conditions are adapted to provide a robust, integrated process that achieves the short residence times described herein and the high heat transfer rates necessary to maximize liquid bio-oil yield while optimizing process integration to maintain catalyst activity by continuous regeneration. The catalysts used herein may be any catalyst useful for selectively extracting oxygen during pyrolysis of the biomass. For example, the catalysts may comprise a metallic element or compound useful for removing oxygen from a fluidized system and fixing the oxygen as a metal oxide. This is in contrast to conventional methods for oxygen removal (i.e., removal as $H_2O$, $CO$, and $CO_2$), and the present invention thus allows for maintaining high carbon efficiency. The catalysts of the invention also preferably have sufficiently high activity to promote low-temperature pyrolysis, which can minimize thermal cracking of the reaction products. Multi-functional catalysts are useful to promote hydrocarbon condensation reactions. The type of reactor used can be important for providing adequate residence times to limit thermal exposure and maximize vapor/catalyst contact time for oxygen removal.

The catalyst can be regenerated in the catalyst regenerating unit or section 150, as shown in FIG. 1 and FIG. 2. The regenerating reactor can be, for example, a bubbling fluidized bed. Air, steam, or a combination of air and steam, with and without an inert gas component such as nitrogen and/or carbon dioxide, can be injected into the regenerating reactor to fluidize the catalyst bed, oxidize any char that is carried over, and regenerate the catalyst by oxidizing surface carbon (e.g., coke). The exothermic carbon oxidation also can impart heat into the catalyst solids to drive the endothermic biomass pyrolysis reactions as the catalyst is recirculated back to the mixing zone. No additional fuel may be required to drive the process. All heat required for catalytic biomass pyrolysis may be obtained from char and coke oxidation if desired.

Catalytic pyrolysis according to the disclosure can provide more selective depolymerization and fragmentation of the cellulose, hemicellulose, and lignin components of the biomass at lower temperatures. This combination of selectivity and lower temperatures can be useful for increasing the bio-oil yield of the pyrolysis reaction.

As already described above in greater detail, known methods for removing oxygen from biomass pyrolysis vapors have included cracking over acidic catalysts and hydrotreating over conventional hydrodesulfurization (HDS) catalysts. Such technologies, however, sacrifice hydrogen and carbon to eliminate oxygen in the form of water and carbon oxides. As pointed out above, this reduces carbon conversion efficiency and thus reduces the overall amount of biofuel that is formed. In contrast, the specific catalyst used according to the present disclosure preferably is one that selectively removes oxygen during biomass pyrolysis, controls biomass pyrolysis to inhibit char formation by targeting the scission of specific bonds in cellulose, hemicellulose, and lignin, and promotes hydrocarbon condensation reactions.

Catalysts used according to the disclosure can selectively remove oxygen through two simultaneous steps: 1) direct deoxygenation over a supported metal or reduced metal oxide catalyst with variable valence states; and 2) indirect deoxygenation that utilizes catalytic hydrogen production for in situ hydrodeoxygenation. The general reactions believed to occur are schematically illustrated in FIG. 3, wherein M is a metal species as described herein. Specific reactions for an iron oxide-based catalyst are shown in Table 2. Similar reactions can be realized with further metal oxides in light of this disclosure.

TABLE 2

| Regeneration |
| --- |
| $Fe_3O_4 + CO \rightarrow 3FeO + CO_2$<br>$Fe_3O_4 + H_2 \rightarrow 3FeO + H_2O$<br>Deoxygenation (direct) |
| $3FeO + ROH \rightarrow RH + Fe_3O_4$<br>Regeneration |
| $Fe_3O_4 + CO \rightarrow 3FeO + CO_2$<br>$Fe_3O_4 + H_2 \rightarrow FeO + H_2O$<br>Deoxygenation (indirect) |
| $3FeO + H_2O \rightarrow H_2 + Fe_3O_4$<br>$ROH + H_2 \rightarrow RH + H_2O$<br>Overall |
| $FeO + ROH \rightarrow RH + Fe_3O_4$ |

In specific embodiments, the catalyst used in the present disclosure may be an iron-containing catalyst, such as an iron oxide material. Iron oxide based materials may be particularly useful because of the ability to be continually regenerated as part of the pyrolysis cycle. For example, FeO may react with oxygen during pyrolysis to form $Fe_3O_4$. In this state, the catalyst may be reduced back to FeO prior to being recycled into the reactor for further reaction. Thus, the invention can include a catalyst regeneration cycle, wherein an oxidized catalyst is withdrawn from the reactor, regenerated, and reduced prior to be being introduced back into the reactor. Many catalyst formulations can provide hydrogen productivity and sustained lifetime through repeated oxidation/reduction cycles. It is believed that these materials can act as a bifunctional catalyst to convert the water vapor formed during biomass pyrolysis into hydrogen to provide a reactive environment for hydrodeoxygenation and can also remove oxygen from biomass pyrolysis vapors without removing carbon.

The presently disclosed subject matter, in part, arises from the recognition of specific combinations of reactions that can be achieved when the correct pyrolysis conditions are provided while the biomass starting material is reacted in the presence of a catalyst as described herein. Solid acids have been found to be beneficial when incorporated into the pyrolysis system. For example, weak acids (such as silica-alumina materials) can function to catalyze dehydration and decarboxylation of pyrolysis products, and strong acids (such as MFI-type zeolites) can function to catalyze alkylation, isomerization, and coking. Moreover, the redox loop illustrated in FIG. 3, wherein transition metals and oxides are continuously cycled, is believed to be a novel approach to biomass pyrolysis and provides a thermochemically favorable operating window. Still further, it has been found that adding hydrogenolysis/hydrogenation components to the process allows for in situ $H_2$ consumption to assist deoxygenation.

In specific embodiments, the catalyst can be a bifunctional iron oxide based material, such as described above, that is supported on an attrition-resistant material, such as a zeolite or any similarly functioning material or may be a further, multi-functional material. As noted above, the choice of support material can affect the types of reactions that occur during pyrolysis (i.e., choosing a weak acid support material versus a strong acid support material). Thus, another example of a material that could be a useful support according to the invention is a material comprising alumina alone or in combination with silica. Of course, other catalysts, supports, and catalyst/support combinations that could be envisioned based on the description provided herein also could be used and are expressly encompassed by the present disclosure.

A thermodynamic analysis of further metal oxide materials that can be used according to some embodiments of the present disclosure is shown in FIG. 4, which specifically illustrates the effect of various metal catalysts used for deoxygenation of phenol to benzene (i.e., an example of the conversion of ROH to RH, as shown in Table 2). The horizontal dashed line in FIG. 4 gives and approximate indication of the conditions above which only direct deoxygenation occurs and below which both direct deoxygenation and indirect deoxygenation occur. The illustrated temperatures in the chart provide an exemplary embodiment of the temperature range over which pyrolysis occurs.

The chart in FIG. 4 shows the relationship between reaction temperature and Delta G ($\Delta G$), or the change in Gibbs free energy in the system. Several metal or metal oxide species are shown to be useful for deoxygenation by direct reaction (e.g., Co, Ni, CoO, and Mn) over the preferred pyrolysis temperature range. Of the analyzed materials, Fe, FeO, and Sn were shown to be useful for both direct deoxygenation (i.e., reaction with the metal) and indirect deoxygenation (i.e., reaction with hydrogen produced from the reaction of the metal with water vapor in the system). This illustrates that metal catalysts having a negative $\Delta G(T)$ for both steps of the redox cycle (metal oxidation and reduction) can be useful as catalyst materials according to the present disclosure. Preferably, useful catalysts will have a $\Delta G$ that is less than about −67 KJ/mol over the pyrolysis temperature range as such catalysts can provide for both direct and indirect deoxygenation. Specific examples of metals that could be used in catalysts according to the present disclosure include manganese, iron, cobalt, nickel, copper, zirconium, molybdenum, palladium, tin, platinum, combinations thereof, oxides thereof, and salts thereof. In preferred embodiments, a useful catalyst can comprise iron oxide or a bimetallic iron-tin oxide. In further embodiments, the catalyst may comprise a mixture of iron oxide and a further metallic oxide promoter (i.e., a metallic oxide that enhances reaction rate or improves product selectivity). Useful metallic oxide promoters can include $CrO_3$, NiO, MnO, CoO, and MoO. Examples of specific iron-based catalysts that may be used according to the invention are provided in U.S. Pat. No. 7,259,286, the disclosure of which is incorporated herein by reference in its entirety. The use of such bifunctional catalysts are beneficial because they can function to convert water vapor formed during biomass pyrolysis into hydrogen to provide a reactive environment for hydrodeoxygenation and can remove oxygen from biomass pyrolysis vapors without removing carbon. Further useful catalysts are described in U.S. Pat. App. No. 61/733, 142, filed Dec. 4, 2012, the disclosure of which is incorporated herein by reference in its entirety.

The amount of catalyst material circulated through the catalytic biomass pyrolysis process can be based upon the biomass throughput of the system. The amount of solid catalyst that is used can be an amount useful to provide the needed heat of pyrolysis and to catalytically control vapor-phase chemistry, as described herein. In some embodiments, the amount of solid catalyst used (based upon the weight of the metal element or compound separate from any support) can be such that the ratio of catalyst to biomass is in the range of about 1:1 to about 100:1 (based on mass). In other embodiments, the ratio of catalyst to biomass throughput can be about 5:1 to about 75:1 or about 10:1 to about 50:1.

As the biomass and the catalyst react and move through the reactor, various reaction mechanisms are believed to occur, including but not limited to the iron-steam reaction, the water gas shift reaction, catalytic deoxygenation of biomass pyrolysis vapors, and hydrodeoxygenation of biomass pyrolysis vapors. Catalyst deactivation also may occur during the reaction arising from carbon deposition on the catalyst surface. With reference again to FIG. 2, the stream 125 exiting the reactor 120 (i.e., comprising circulating solids, vapors, and gases) is transferred to the separation unit 130 (a cyclone separator in the exemplified embodiment) that is used to separate the solids (e.g., spent catalyst and char) exiting as stream 137 from the vapors and gases exiting as stream 135.

Preferably, the catalyst used according to the present disclosure is a regenerable catalyst. Specifically, in embodiments wherein the catalyst may be at least partially deactivated, the catalyst used in the invention can be regenerated to the active state (e.g., by removal of deposits, such as carbon). To this end, it is preferable for the catalyst to be formed of a material such that the catalyst is insensitive to the presence of materials that may lead to deactivation of the catalyst, such as ash. Regeneration of the catalyst more particularly can relate to the above-described process wherein the catalyst that has been oxidized while catalyzing the pyrolysis reaction is further processed to reduce the material to the active state for reuse in the pyrolysis reaction.

After separation, the solids exiting the separator 130 in stream 137 collect in a standpipe (not shown in FIG. 2) and flow into the regenerator reactor 150. Air, steam, or a mixture thereof is input to the regenerator as stream 151 to oxidize any biomass char and coke that deposits on the catalyst surface. Primary regenerator products are $CO_2$ (exiting with exhaust stream 159) and heat imparted to the regenerated catalyst exiting in stream 157. The $CO_2$ can be collected and removed for other use or sequestration.

In the embodiment illustrated in FIG. 2, the hot catalyst leaving the regenerator in stream 157 is transferred through a J-leg 158 into a reducing zone or unit 160 located upstream from the riser reactor 120. In other embodiments, further configurations or components suitable for the transfer of catalyst between the regenerator and the reducing zone include, but are not limited to, L valves, Y leg, seal pots, and the like. In the reducing zone, the catalyst is reduced by recirculating a fraction of the tail gas stream 147 that exit the condenser system or unit 140 (described below). These gases are forced through a blower 180 and pass as reducing stream 163 into the reducing zone 160 along with additional carrier gas (e.g., CO and $H_2$) in stream 161, where the catalyst is cycled back to its oxygen-reactive state. The combination of gases and catalyst move through the reducing zone 160 and back into the riser reactor 120, preferably at a sufficiently high throughput to convey the solids up the length of the reactor at high velocity to achieve the rapid heat transfer and short pyrolysis residence time desired.

Returning to the cyclone separator 130, the mixture of pyrolysis vapors (in the gas phase) and gases that were separated from the solids fraction immediately downstream of the reactor 120 are transferred to a condensation system or unit 140 where the vapors are condensed into a liquid (stream 145) that typically contains an aqueous phase and an organic phase. The aqueous phase can be predominately water (e.g., about 40% to about 99% water) with water-soluble organic materials such as acids (e.g., acetic acid), phenols, and unconverted anhydro-sugars. The organic phase typically has a much lower oxygen content than the water-rich aqueous phase and different physical properties such as density, polarity, and/or other properties. The two phases are physically separated (see unit 170 in FIG. 1), such as by known separation processes, and the hydrocarbon-rich bio-oil is collected at the outlet (stream 175 in FIG. 1).

Also exiting the condensation system and product collection is a fraction of permanent, reducing gases (i.e., the tail gases in stream 147), such as carbon monoxide. The catalytic pyrolysis tail gas exiting the condensation system (see FIG. 1) can be used for heat and power production based on its heating value, but it can also be used to reduce the regenerated catalyst. Hydrogen and carbon monoxide are effective reducing agents. Specific catalysts may promote the water gas shift reaction resulting in a catalytic pyrolysis tail gas that is rich in hydrogen. This is also advantageous for catalyst regeneration. Therefore, the presently disclosed subject matter is particularly beneficial by providing for the use of recycled tail gas or input hydrogen to reduce a metal oxide catalyst before it is recirculated to the mixing zone. At least a portion of the gases may be purged from the system (see stream 149 in FIG. 2).

Of course, it is understood that the systems described in relation to FIG. 1 and FIG. 2 are merely provided as an example of a catalytic biomass pyrolysis system that may be used according to the invention. Other, similar systems may be used. Likewise, individual components of the described system may be replaced with other suitable means for providing the same or similar function.

The present disclosure can be understood in specific embodiments as providing a catalytic biomass pyrolysis process comprising reacting a biomass starting material under pyrolysis conditions in the presence of a catalyst to form a bio-oil. Specifically, the formed bio-oil may have an oxygen content, as otherwise described herein. The bio-oil may be present in a vapor and/or gas phase and may be condensed to a liquid phase after the pyrolysis reaction. The catalytic biomass pyrolysis process may be defined as comprising forming a stream that comprises a bio-oil containing reaction product and catalyst. The catalyst may be separated from the bio-oil containing reaction product, and such separation further may include separating any solid component of the bio-oil containing reaction product. Thus, the method of forming a bio-oil may comprise separating from the bio-oil containing reaction product any materials that are not liquid at ambient conditions. The method also may comprise regenerating the catalyst and recycling the catalyst back into the catalytic biomass pyrolysis reaction. The method also may comprise separating from the bio-oil containing reaction product any material that is a gas at ambient conditions.

Beneficially, the bio-oil produced by the catalytic biomass pyrolysis process of the invention may be used directly as a refinery feedstock. As such, the bio-oil product may be blended at any ratio with petroleum crude and likewise used as a refinery feedstock.

EXPERIMENTAL

The presently disclosed subject matter is more fully illustrated by the following examples, which are set forth to illustrate the presently disclosed subject matter and provide full disclosure, and they are not to be construed as limiting thereof.

Example 1

Deoxygenation of Pyrolysis Vapors

To illustrate the effectiveness of metal oxide-based catalysts for deoxygenation of biomass pyrolysis vapors, guaiacol (2-methoxy phenol) was introduced into a fixed bed microreactor packed with a reduced iron oxide catalyst. The iron oxide catalysts were reduced at 500° C. in 50% hydrogen for one hour prior to testing. Reactions were carried out at 400-500° C. with a LHSV of 0.15 $h^{-1}$. Nitrogen was used as a carrier gas with a flow rate of 90 cc/min with a 10 cc/min flow of argon as a tracer gas. Reactor products were analyzed using an on line residual gas analyzer with mass spectrometer. The major species identified from guaiacol deoxygenation are reported in Table 3.

TABLE 3

| Temp (° C.) | Conv. (%) | Major Products (wt %) | | | | | | | | | |
|---|---|---|---|---|---|---|---|---|---|---|---|
| | | Benzene | Toluene | Phenol | Cresol | CO | $CO_2$ | $H_2O$ | $H_2$ | $CH_4$ | Coke |
| 400 | 48.6 | 0.3 | 0.9 | 3.1 | 2.0 | 1.8 | 6.6 | 11.5 | 0.0 | 0.4 | 22.1 |
| 450 | 73.7 | 0.6 | 1.0 | 12.4 | 3.4 | 5.6 | 9.6 | 14.8 | 0.1 | 1.2 | 25.1 |
| 500 | 98 | 1.7 | 0.6 | 25.3 | 4.7 | 6.0 | 14.9 | 16.2 | 0.2 | 2.2 | 26.1 |

Removing the methoxy group from guaiacol is the most facile deoxygenation pathway. The detection of alkyl phenols in the product indicates that oxygen can be removed from guaiacol using iron oxide-based catalysts without losing carbon (oxygen abstraction). Formation of cresol may have resulted from the alkylation of phenol by methyl radicals and other alkyl groups generated when the methoxy group is removed.

Reaction temperature had a significant effect on guaiacol conversion and deoxygenated product distribution. Conversion increased from 49% (at 400° C.) to 98% (at 500° C.). Product water content also increased with increasing temperature, indicating that the dehydration activity of the catalyst is increasing with temperature. Phenol is a major product at all reaction temperatures, along with other deoxygenated products.

Example 2

Catalytic Deoxygenation of Biomass-Derived Pyrolysis Vapors

A bench-scale pyrolysis unit was used to evaluate catalytic deoxygenation with real biomass-derived pyrolysis vapors from a variety of feedstocks. The unit had a maximum throughput of ~500 g/hr of pulverized biomass (212-500 μm particle size) metered through a twin screw biomass feeder. The speed of the first screw was set to meter the feedstock onto a second screw that transferred the feed to the inlet of the reactor.

The biomass feed dropped though a 1-inch diameter stainless tube into an eductor. A pre-heated dry nitrogen stream passed through the eductor, pneumatically conveying the biomass feedstock into and through the entrained flow pyrolysis section (a 17-ft, 3/8"-diameter stainless steel tube wound into a 3-ft high coil) placed inside a three-zoned furnace with a maximum temperature of 1,200° C. Gas velocity was adjustable between 5 to 40 ft/sec by changing the nitrogen carrier gas flow rate. The biomass residence time through the system at normal operating conditions was about 0.5-2 seconds.

Carrier gas, biomass pyrolysis vapors, and unconverted biomass char and ash exited the bottom of the heated section into a heated cyclone for particulate removal. The cyclone was 8-in long with a 2-in diameter by 4-in long barrel designed to remove particles ≤10 μm with greater than 90% efficiency. Char particles were cooled and collected for analysis.

Downstream of the cyclone was a 1-in.-diameter fixed-bed catalyst reactor and a condensation system. The condenser was a shell-and-tube heat exchanger design with a 2-in. diameter, 36-in. long inner tube surrounded by a 3-in. diameter stainless steel cylindrical shell. Condensed bio-oils were collected at the outlet of the condenser in a glass bottle cooled in dry ice. The uncondensed aerosols and vapors exited the condenser and were introduced into an impinger, also cooled in dry ice. The condensed products collected in these two vessels were mixed and analyzed. An on-line microGC was used to measure the permanent product gases. A gas sample was pulled through a filter, dried, and injected onto the four GC columns. Permanent gases, up to $C_6$ hydrocarbons, were measured in 3 minute cycles. Argon was introduced into the carrier gas and used as an internal standard to determine the amount of gas phase products produced.

A baseline (uncatalyzed) bio-oil was produced from white oak pyrolysis at 500° C. with a residence time of 0.75 seconds in the pyrolysis reactor and cyclone removal of char. Physical and chemical characteristics of the white oak feedstock, baseline bio-oil, and baseline char are presented in Table 4 below. The high fixed carbon and low oxygen content of the baseline char indicates near complete pyrolysis. As expected, the ultimate analyses of the baseline bio-oil and the white oak feedstock are similar.

TABLE 4

|  | Baseline Bio-Oil | Biomass (White Oak) | Baseline Char |
|---|---|---|---|
| Proximate Analysis (wt %) | | | |
| Volatile Matter | 89.13 | 77.80 | 25.50 |
| Fixed Carbon | 10.92 | 18.06 | 68.02 |

TABLE 4-continued

|  | Baseline Bio-Oil | Biomass (White Oak) | Baseline Char |
|---|---|---|---|
| Ash | 0.05 | 0.38 | 4.22 |
| Higher Heating Value (BTU/lb) | 7082 | 7940 | 11962 |
| Ultimate Analysis (wt %) | | | |
| Carbon | 41.17 | 47.95 | 75.37 |
| Hydrogen | 7.48 | 6.06 | 3.25 |
| Oxygen (by difference) | 51.19 | 45.50 | 16.88 |
| Nitrogen | 0.09 | 0.10 | 0.26 |
| Sulfur | 0.01 | 0.01 | 0.02 |
| Ash | 0.05 | 0.38 | 4.22 |

The Fe-based catalyst was also tested in the bench scale pyrolysis reactor to determine its ability to deoxygenate actual pyrolysis vapors. Prior to pyrolysis testing the catalyst was reduced in a 5% $H_2$/balance $N_2$ stream for two hours at 500° C. in a fixed bed reactor located downstream of the cyclone in the pyrolysis system. After catalyst reduction, the temperature in the fixed bed reactor was lowered to 450° C. The pyrolysis conditions were identical to those used in producing the baseline bio-oil from the white oak feedstock. Catalytic pyrolysis of biomass pyrolysis vapors was achieved for 30 minutes. 39.4-g of biomass was fed to the pyrolysis system and 10.0-g of bio-crude and 4-g of char were collected. Mass balance closure for this trial was 79.4 wt %. The gas yield during catalytic pyrolysis was more than 3 times higher compared to the baseline bio-oil production. Nearly 16 times more $H_2$ was produced during catalytic pyrolysis compared to non-catalytic pyrolysis, while the CO concentration was unchanged.

Ultimate analysis of the catalytically upgraded oil is given in Table 5. A significant reduction in oxygen content for the pyrolysis oil modified with the Fe-based catalyst compared to the standard bio-oil was observed. The ash content of the upgraded oil was unusually high compared to the baseline bio-oil. The high solids loading of the bio-crude is likely the result of catalyst carryover from the fixed bed reactor located upstream of the condensation train. The ultimate analysis of the catalytically upgraded bio-oil was renormalized assuming that the ash content was equal to the ash content measured for the baseline bio-oil. These results suggest that the oxygen content of bio-oil can be substantially reduced, by roughly 350%, using an iron oxide-based catalyst.

TABLE 5

| Ultimate Analyses (wt %) | Catalytically Upgraded Bio-Oil | Catalytically Upgraded Bio-Oil (normalized) |
|---|---|---|
| Carbon | 48.4 | 74.99 |
| Hydrogen | 6.62 | 10.26 |
| Oxygen (by difference) | 9.26 | 14.36 |
| Nitrogen | 0.11 | 0.17 |
| Sulfur | 0.09 | 0.14 |
| Ash | 35.55 | 0.05 |

Example 3

An iron-based catalyst suitable for catalytic fast pyrolysis of biomass according to the disclosure was prepared. In this embodiment, catalyst preparation was carried out by synthesis of a catalyst precursor, spray drying of the catalyst precursor, and calcination.

The catalyst precursor was prepared by co-precipitation at a constant pH of 6.2 using 1.0-M solution containing $Fe(NO_3)_3.9H_2O$ and $Cu(NO_3)_3.2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the un-dried, re-slurried Fe/Cu precipitate. This catalyst precursor was then slurried with polysilicic acid solution in a ratio effective to produce a final catalyst composition having 10 wt % $SiO_2$. The pH of the slurry was 6.4. Nitric acid was added to the slurry to reduce the ph to 1.5. A Niro Inc. spray dryer having a diameter of 3 feet and a height of 6 feet was used to spray-dry the slurry. Finally the spray-dried catalyst was calcined in an oxygen-containing atmosphere for 5 hours at 300° C.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A catalytic biomass pyrolysis process comprising:
feeding a biomass starting material into a reactor wherein the biomass starting material is subjected to pyrolysis conditions in the presence of a solid catalyst in a reduced state to remove oxygen from the biomass starting material, form a pyrolysis product stream comprising a pyrolysis product, and convert at least a portion of the catalyst to an oxidized state;
transferring the pyrolysis product stream to a separator;
separating a vapor and gas fraction and a solids fraction comprising non-catalyst solids and the solid catalyst;
regenerating the solid catalyst by removing the non-catalyst solids from the solid catalyst;
subjecting the solid catalyst to conditions wherein the solid catalyst is converted back to the reduced state; and
recycling at least a portion of the regenerated and reduced catalyst into the reactor;
wherein the process exhibits a carbon conversion efficiency of about 20% or greater by weight.

2. The process of claim 1, wherein the biomass starting material comprises a lignocellulosic material.

3. The process of claim 1, wherein the biomass starting material is particularized with an average particle size of about 25 mm or less.

4. The process of claim 1, wherein the catalyst is insensitive to ash present in the biomass or formed in said pyrolysis process.

5. The process of claim 1, wherein the catalyst comprises an iron oxide.

6. The process of claim 1, wherein the catalyst comprises a mixed metal oxide.

7. The process of claim 6, wherein the catalyst comprises a mixture of iron oxide and tin oxide or a mixture of iron oxide and a metallic oxide promoter.

8. The process of claim 7, wherein the promoter is selected from the group consisting of chromium oxide, nickel oxide, manganese oxide, cobalt oxide, molybdenum oxide, and combinations thereof.

9. The process of claim 1, wherein the catalyst is a bifunctional catalyst that optionally includes a component that utilizes water-bound hydrogen as a deoxygenation reagent.

10. The process of claim 1, wherein the catalyst comprises a supported metal.

11. The process of claim 1, wherein the biomass starting material is fed into the reactor without premixing with the catalyst, or wherein the biomass starting material is fed into the reactor without premixing with a heat transfer medium.

12. The process of claim 1, wherein the reactor is a transport reactor, and the biomass starting material is transported through the transport reactor at a rate such that the residence time is about 5 seconds or less.

13. The process of claim 1, wherein the pyrolysis conditions include a temperature of about 200° C. to about 700° C. or a temperature of about 550° C. or less.

14. The process of claim 1, wherein the catalyst and the biomass starting material are provided in a ratio of about 1:1 to about 100:1 based on mass.

15. The process of claim 1, wherein the pyrolysis conditions include a pressure of up to about 25 bar (2.5 MPa).

16. The process of claim 1, wherein removal of oxygen from the biomass starting material is via one or both of direct catalytic deoxygenation and indirect deoxygenation through catalytic hydrogen production and in situ hydrodeoxygenation.

17. The process of claim 1, further comprising regenerating the catalyst by removing non-catalyst solids therefrom prior to subjecting the catalyst to conditions wherein the catalyst is converted back to the reduced state.

18. The process of claim 1, wherein the vapor and gas fraction is transferred to a condenser wherein a liquid product is separated from a gaseous fraction.

19. The process of claim 18, wherein the liquid product is separated into an aqueous phase and a bio-oil.

20. The process of claim 19, wherein the bio-oil has an oxygen content of about 1% to about 25% by weight on a dry basis based on the overall weight of the bio-oil.

21. The process of claim 1, wherein the process exhibits a carbon conversion efficiency of about 20% to about 65% by weight.

22. The process of claim 1, further comprising isolating a bio-oil fraction from the pyrolysis product.

* * * * *